United States Patent
Gautam et al.

(10) Patent No.: US 12,311,876 B2
(45) Date of Patent: May 27, 2025

(54) PROJECTED SECURITY ZONE

(71) Applicant: GM Global Technology Operations LLC, Detroit, MI (US)

(72) Inventors: Pallavi Gautam, Royal Oak, MI (US); Joseph F. Szczerba, Grand Blanc, MI (US); Robert C. Jablonski, Rochester, MI (US); Manoj Kumar Sharma, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 85 days.

(21) Appl. No.: 18/470,860

(22) Filed: Sep. 20, 2023

(65) Prior Publication Data
US 2025/0091548 A1 Mar. 20, 2025

(51) Int. Cl.
*B60R 25/104* (2013.01)
*B60Q 1/50* (2006.01)
*B60R 25/25* (2013.01)
*B60R 25/30* (2013.01)
*B60R 25/31* (2013.01)
*B60R 25/10* (2013.01)

(52) U.S. Cl.
CPC ............ *B60R 25/104* (2013.01); *B60Q 1/509* (2022.05); *B60R 25/25* (2013.01); *B60R 25/257* (2013.01); *B60R 25/305* (2013.01); *B60R 25/31* (2013.01); *B60R 2025/1013* (2013.01)

(58) Field of Classification Search
CPC ..... B60R 25/104; B60R 25/25; B60R 25/257; B60R 25/305; B60R 25/31; B60R 2025/1013; B60Q 1/509
See application file for complete search history.

(56) References Cited

U.S. PATENT DOCUMENTS

| | | | |
|---|---|---|---|
| 6,577,226 B1 * | 6/2003 | Steiner | G07C 9/00309 340/5.72 |
| 9,321,395 B2 * | 4/2016 | Ammar | B60Q 1/32 |
| 9,387,824 B2 * | 7/2016 | Pisz | G06F 3/017 |
| 9,421,902 B2 * | 8/2016 | Kowatzki | B60Q 1/2696 |
| 9,567,102 B1 * | 2/2017 | Ross | G01C 21/365 |
| 9,751,458 B1 * | 9/2017 | Dellock | B60Q 1/2696 |
| 9,992,465 B1 * | 6/2018 | Schreiber | H04N 9/3194 |
| 10,065,555 B2 * | 9/2018 | Abrams | B60Q 1/323 |
| 10,176,368 B1 * | 1/2019 | Ramakrishnan | B60Q 1/2669 |
| 10,223,915 B2 * | 3/2019 | Haines | B60Q 1/324 |
| 10,421,436 B2 * | 9/2019 | Gage | G06V 20/56 |
| 10,563,448 B2 * | 2/2020 | Nania | E05B 81/04 |

(Continued)

FOREIGN PATENT DOCUMENTS

| | | | | |
|---|---|---|---|---|
| DE | 102006019284 A1 * | 10/2007 | | B60Q 1/323 |
| DE | 102016007764 A1 | 12/2017 | | |
| DE | 102016014709 A1 | 6/2018 | | |

*Primary Examiner* — Nay Tun
(74) *Attorney, Agent, or Firm* — Vivacqua Crane, PLLC

(57) ABSTRACT

A system for providing a projected security zone adjacent a vehicle includes an external projector in communication with a system controller and adapted to project a first graphic onto a surface adjacent the vehicle, the first graphic defining a pre-determined security zone, and a plurality of onboard sensors in communication with the system controller and adapted to detect the presence of an individual positioned within the projected security zone, the system controller adapted to provide a warning to the individual.

20 Claims, 6 Drawing Sheets

(56) References Cited

U.S. PATENT DOCUMENTS

| | | | | |
|---|---|---|---|---|
| 11,002,827 | B2* | 5/2021 | Blanco | G08B 13/19647 |
| 11,258,963 | B2* | 2/2022 | Ozaki | G06V 20/64 |
| 2007/0053195 | A1* | 3/2007 | Alberti | B60Q 1/2665 |
| | | | | 362/494 |
| 2008/0296926 | A1* | 12/2008 | Hanzel | H03K 17/941 |
| | | | | 704/251 |
| 2009/0273941 | A1* | 11/2009 | Englander | B60Q 1/324 |
| | | | | 362/494 |
| 2015/0298598 | A1* | 10/2015 | Nüssli | H04N 9/3147 |
| | | | | 345/2.2 |
| 2017/0130510 | A1* | 5/2017 | Nania | E05B 81/78 |
| 2017/0210282 | A1* | 7/2017 | Rodriguez Barros | B60Q 1/324 |
| 2018/0272992 | A1* | 9/2018 | Gage | G06V 20/56 |
| 2019/0164344 | A1* | 5/2019 | Potter | B60Q 1/507 |
| 2020/0207258 | A1* | 7/2020 | Tezuka | F21S 41/143 |
| 2020/0386031 | A1* | 12/2020 | Tsunekawa | G06V 10/255 |
| 2022/0289138 | A1* | 9/2022 | Gammelgard | G05D 1/0061 |
| 2024/0416921 | A1* | 12/2024 | Batie | B60W 40/08 |

* cited by examiner

PROJECTED SECURITY ZONE

INTRODUCTION

The present disclosure relates to a system and method for providing warnings to an individual who is located within a security zone projected onto the ground adjacent to a vehicle.

Vehicles are equipped with many sensors to monitor the environment surrounding the vehicle, and to provide warnings when objects get to close, etc. Current sensor systems of a vehicle are not adapted to actively project a security zone adjacent a vehicle and to provide a warning to an individual who is located within the security zone and does not have credentials that authorize the individual to be within the security zone.

Thus, while current systems and methods achieve their intended purpose, there is a need for a new and improved system and method for projecting a security zone adjacent a vehicle and providing a warning to an individual when the individual is located within the security zone.

SUMMARY

According to several aspects of the present disclosure, a method of providing a projected security zone adjacent a vehicle includes projecting, with an external projector in communication with a system controller, a first graphic onto a surface adjacent the vehicle, the first graphic defining a pre-determined security zone, detecting, with a plurality of onboard sensors in communication with the system controller, the presence of an individual positioned within the projected security zone, and providing, with the system controller, a warning to the individual.

According to another aspect, the method further includes determining, with the system controller, if the individual possesses credentials authorizing the individual to be positioned within the projected security zone, and wherein, the providing, with the system controller, a warning to the individual further includes providing, with the system controller, a warning to the individual when the individual does not possess credentials authorizing the individual to be positioned within the security zone.

According to another aspect, the determining, with the system controller, if the individual possesses credentials authorizing the individual to be positioned within the projected security zone further includes accessing, with the system controller, via a wireless communication module, digital credentials of the individual, wherein the digital credentials are located within at least one of a cloud-based database and a personal device carried by the individual.

According to another aspect, the determining, with the system controller, if the individual possesses credentials authorizing the individual to be positioned within the projected security zone further includes capturing, with a camera in communication with the system controller, images of the individual, and identifying, with a computer vision algorithm within the system controller, physical credentials, wherein the physical credentials include at least one of facial identification, specific clothing and a badge.

According to another aspect, the method further includes identifying, with the system controller, threatening behavior exhibited by the individual, and wherein, the providing, with the system controller, a warning to the individual further includes providing, with the system controller, a warning to the individual when the individual possesses credentials authorizing the individual to be positioned within the security zone, and the system controller identifies threatening behavior exhibited by the individual.

According to another aspect, the identifying, with the system controller, threatening behavior by exhibited by the individual further includes at least one of receiving, with the system controller, via an external microphone, verbal communications from the individual and identifying, with the system controller, threatening language, and capturing, with a camera in communication with the system controller, images of the individual, and identifying, with a computer vision algorithm within the system controller, threatening gestures made by the individual.

According to another aspect, the providing, with the system controller, a warning to the individual further includes projecting, with the external projector in communication with the system controller, a second graphic onto the surface adjacent the vehicle, the second graphic being color-coded and highlighting the position of the individual.

According to another aspect, the providing, with the system controller, a warning to the individual further includes after projecting the second graphic, determining, with the system controller, that the individual is still positioned within the safety zone, and providing, via external speakers, an audible warning to the individual.

According to another aspect, the method further includes providing, with the system controller, via a wireless communication module, a warning signal to a personal device carried by the individual.

According to another aspect, the providing, with the system controller, a warning to the individual further includes after providing, via the external speakers, an audible warning to the individual, determining, with the system controller, that the individual is still positioned within the security zone, and providing, with the system controller, via the wireless communication module, a haptic warning signal to the personal device carried by the individual.

According to another aspect, the method further includes detecting, with the plurality of onboard sensors, when an occupant within the vehicle exits the vehicle, and wherein, the projecting, with an external projector in communication with the system controller, the first graphic onto the surface adjacent the vehicle further includes projecting, with the external projector, the first graphic onto the surface adjacent the vehicle and centered around the occupant of the vehicle.

According to another aspect, the providing, with the system controller, via the wireless communication module, a warning to a personal device carried by the individual further includes providing, with the system controller, via the wireless communication module, a warning message to a personal device carried by the occupant, and the providing, with the system controller, via the wireless communication module, a haptic warning signal to a personal device carried by the individual further includes providing, with the system controller, via the wireless communication module, a haptic warning signal to a personal device carried by the occupant.

According to another aspect, the method further includes receiving, with the system controller, via the wireless communication module, instructions from the occupant to provide a warning to an individual within the projected security zone, and wherein, the providing, with the system controller, a warning to the individual further includes providing, with the system controller, a warning to the individual when instructions are received from the occupant.

According to several aspects of the present disclosure, a system for providing a projected security zone adjacent a vehicle includes an external projector in communication with a system controller and adapted to project a first graphic onto a surface adjacent the vehicle, the first graphic defining a pre-determined security zone, and a plurality of onboard sensors in communication with the system controller and adapted to detect the presence of an individual positioned within the projected security zone, the system controller adapted to provide a warning to the individual.

According to another aspect, the system controller is further adapted to determine if the individual possesses credentials authorizing the individual to be positioned within the projected security zone by at least one of accessing, with the system controller, via a wireless communication module, digital credentials of the individual, wherein the digital credentials are located within at least one of a cloud-based database and a personal device carried by the individual, and capturing, with a camera in communication with the system controller, images of the individual and identifying, with a computer vision algorithm within the system controller, physical credentials, wherein the physical credentials include at least one of facial identification, specific clothing and a badge, wherein, the system controller is adapted to provide a warning to the individual when the individual does not possess credentials authorizing the individual to be positioned within the security zone.

According to another aspect, the system controller is further adapted to identify threatening behavior exhibited by the individual by at least one of receiving, with the system controller, via an external microphone, verbal communications from the individual and identifying, with the system controller, threatening language, and capturing, with a camera in communication with the system controller, images of the individual, and identifying, with a computer vision algorithm within the system controller, threatening gestures made by the individual, and wherein, the system controller is further adapted to provide a warning to the individual when the individual possesses credentials authorizing the individual to be positioned within the security zone, and the system controller identifies threatening behavior exhibited by the individual.

According to another aspect, when providing a warning to the individual the system controller is further adapted to project, with the external projector in communication with the system controller, a second graphic onto the surface adjacent the vehicle, the second graphic being color-coded and highlighting the position of the individual, determine that the individual is still positioned within the security zone after projecting the second graphic, and provide, via external speakers, an audible warning to the individual and provide, via the wireless communication module, a warning signal to a personal device carried by the individual, and determine that the individual is still positioned within the security zone after providing the audible warning and provide, via the wireless communication module, a haptic warning signal to the personal device carried by the individual.

According to another aspect, the system controller is further adapted to detect, with the plurality of onboard sensors, when an occupant within the vehicle exits the vehicle and to project the first graphic centered around the occupant of the vehicle, receive, via the wireless communication module, instructions from the occupant to provide a warning to an individual within the projected security zone, and provide a warning to the individual when instructions are received from the occupant.

According to another aspect, when providing a warning signal to the personal device carried by the individual the system controller is further adapted to provide, via the wireless communication module, the warning signal to a personal device carried by the occupant, and when providing a haptic warning signal to the personal device carried by the individual the system controller is further adapted to provide, via the wireless communication module, a haptic warning signal to the personal device carried by the occupant.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

Figure 1:
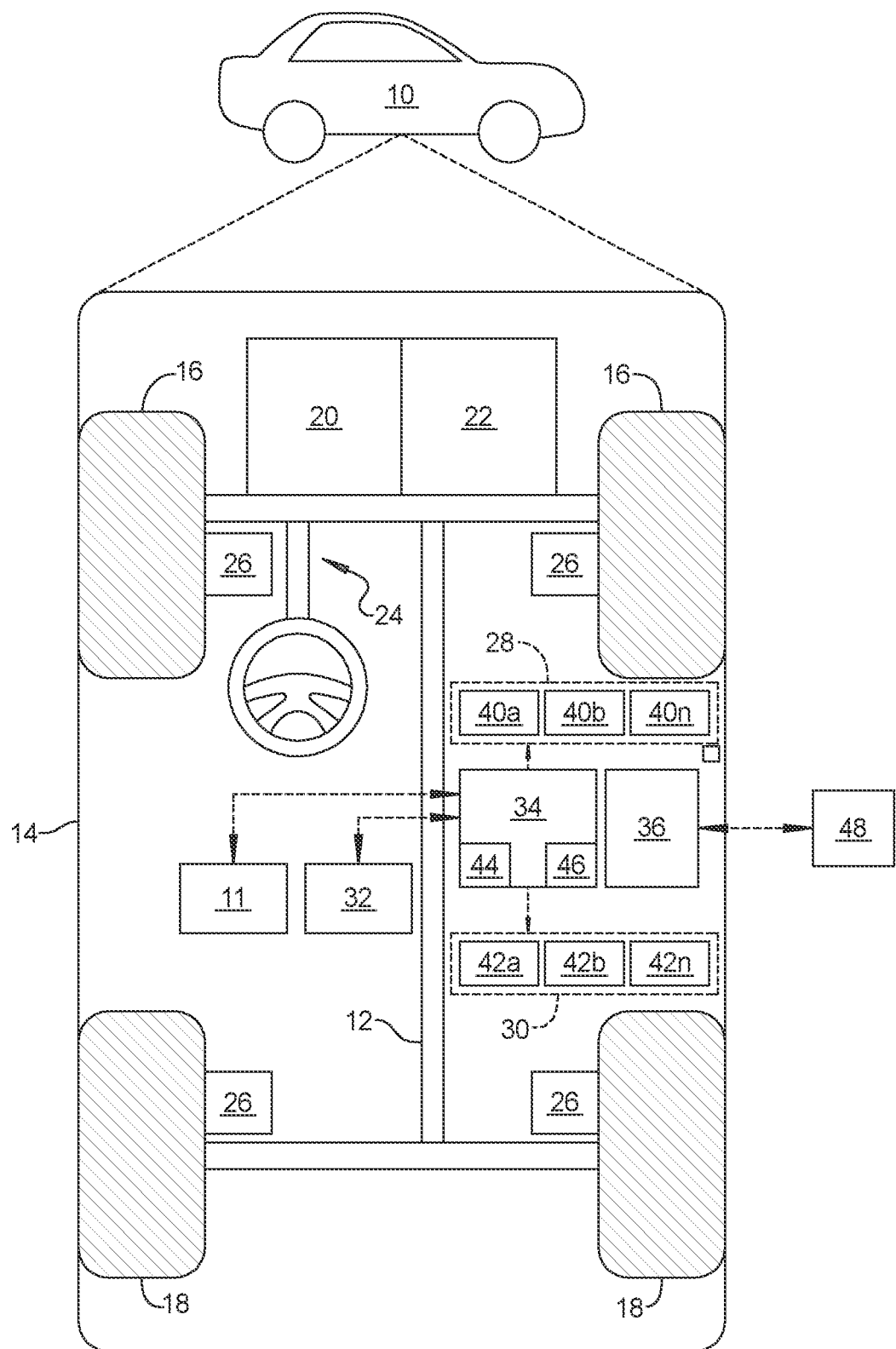
FIG. 1 is a schematic diagram of a vehicle having a system for projecting a security zone and providing a warning to an individual positioned within the security zone according to an exemplary embodiment.

The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

DETAILED DESCRIPTION

The following description is merely exemplary in nature and is not intended to limit the present disclosure, application, or uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. Although the figures shown herein depict an example with certain arrangements of elements, additional intervening elements, devices, features, or components may be present in actual embodiments. It should also be understood that the figures are merely illustrative and may not be drawn to scale.

As used herein, the term "vehicle" is not limited to automobiles. While the present technology is described primarily herein in connection with automobiles, the technology is not limited to automobiles. The concepts can be used in a wide variety of applications, such as in connection with aircraft, marine craft, other vehicles, and consumer electronic components.

In accordance with an exemplary embodiment, FIG. 1 shows a vehicle 10 with an associated system 11 for providing warnings to an occupant 56 within a vehicle 10 to inform the occupant 56 of threat vehicles when the vehicle 10 is located at an intersection in accordance with various embodiments. In general, the system 11 works in conjunction with other systems within the vehicle 10 to display various information and infotainment content for the passenger. The vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The front wheels 16 and rear wheels 18 are each rotationally coupled to the chassis 12 near a respective corner of the body 14.

In various embodiments, the vehicle 10 is an autonomous vehicle and the system 11 is incorporated into the autonomous vehicle 10. An autonomous vehicle 10 is, for example, a vehicle 10 that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), etc., can also be used. In an exemplary embodiment, the vehicle 10 is equipped with a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver. The novel aspects of the present disclosure are also applicable to non-autonomous vehicles.

As shown, the vehicle 10 generally includes a propulsion system 20, a transmission system 22, a steering system 24, a brake system 26, a sensor system 28, an actuator system 30, at least one data storage device 32, a vehicle controller 34, and a wireless communication module 36. In an embodiment in which the vehicle 10 is an electric vehicle, there may be no transmission system 22. The propulsion system 20 may, in various embodiments, include an internal combustion engine, an electric machine such as a traction motor, and/or a fuel cell propulsion system. The transmission system 22 is configured to transmit power from the propulsion system 20 to the vehicle's front wheels 16 and rear wheels 18 according to selectable speed ratios. According to various embodiments, the transmission system 22 may include a step-ratio automatic continuously-variable transmission, or other appropriate transmission. The brake system 26 is configured to provide braking torque to the vehicle's front wheels 16 and rear wheels 18. The brake system 26 may, in various embodiments, include friction brakes, brake by wire, a regenerative braking system such as an electric machine, and/or other appropriate braking systems. The steering system 24 influences a position of the front wheels 16 and rear wheels 18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, and/or other sensors. The cameras can include two or more digital cameras spaced at a selected distance from each other, in which the two or more digital cameras are used to obtain stereoscopic images of the surrounding environment in order to obtain a three-dimensional image or map. The plurality of sensing devices 40a-40n is used to determine information about an environment surrounding the vehicle 10. In an exemplary embodiment, the plurality of sensing devices 40a-40n includes at least one of a motor speed sensor, a motor torque sensor, an electric drive motor voltage and/or current sensor, an accelerator pedal position sensor, a coolant temperature sensor, a cooling fan speed sensor, and a transmission oil temperature sensor. In another exemplary embodiment, the plurality of sensing devices 40a-40n further includes sensors to determine information about the environment surrounding the vehicle 10, for example, an ambient air temperature sensor, a barometric pressure sensor, and/or a photo and/or video camera which is positioned to view the environment in front of the vehicle 10. In another exemplary embodiment, at least one of the plurality of sensing devices 40a-40n is capable of measuring distances in the environment surrounding the vehicle 10.

In a non-limiting example wherein the plurality of sensing devices 40a-40n includes a camera 38, the plurality of sensing devices 40a-40n measures distances using an image processing algorithm configured to process images from the camera and determine distances between objects. In another non-limiting example, the plurality of vehicle sensors 40a-40n includes a stereoscopic camera having distance measurement capabilities. In one example, at least one of the plurality of sensing devices 40a-40n is affixed inside of the vehicle 10, for example, in a headliner of the vehicle 10, having a view through the windshield of the vehicle 10. In another example, at least one of the plurality of sensing devices 40a-40n is a camera affixed outside of the vehicle 10, for example, on a roof of the vehicle 10, having a view of the environment surrounding the vehicle 10 and adapted to collect information (images) related to the environment outside the vehicle 10. It should be understood that various additional types of sensing devices, such as, for example, LiDAR sensors, ultrasonic ranging sensors, radar sensors, and/or time-of-flight sensors are within the scope of the present disclosure. The actuator system 30 includes one or more actuator devices 42*a*-42*n* that control one or more vehicle 10 features such as, but not limited to, the propulsion system 20, the transmission system 22, the steering system 24, and the brake system 26.

The vehicle controller 34 includes at least one processor 44 and a computer readable storage device or media 46. The at least one data processor 44 can be any custom made or commercially available processor, a central processing unit (CPU), a graphics processing unit (GPU), an auxiliary processor among several processors associated with the vehicle controller 34, a semi-conductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the at least one data processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which includes an ordered listing of executable instructions for implementing logical functions. The instructions, when executed by the at least one processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

In various embodiments, one or more instructions of the vehicle controller 34 are embodied in a trajectory planning system and, when executed by the at least one data processor 44, generates a trajectory output that addresses kinematic and dynamic constraints of the environment. For example, the instructions receive as input process sensor and map data. The instructions perform a graph-based approach with a customized cost function to handle different road scenarios in both urban and highway roads.

The wireless communication module 36 is configured to wirelessly communicate information to and from other remote entities 48, such as but not limited to, other vehicles ("V2V" communication,) infrastructure ("V2I" communication), remote systems, remote servers, cloud computers, and/or personal devices. In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The vehicle controller 34 is a non-generalized, electronic control device having a preprogrammed digital computer or processor, memory or non-transitory computer readable medium used to store data such as control logic, software applications, instructions, computer code, data, lookup tables, etc., and a transceiver [or input/output ports]. Computer readable medium includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device. Computer code includes any type of program code, including source code, object code, and executable code.

Figure 2:
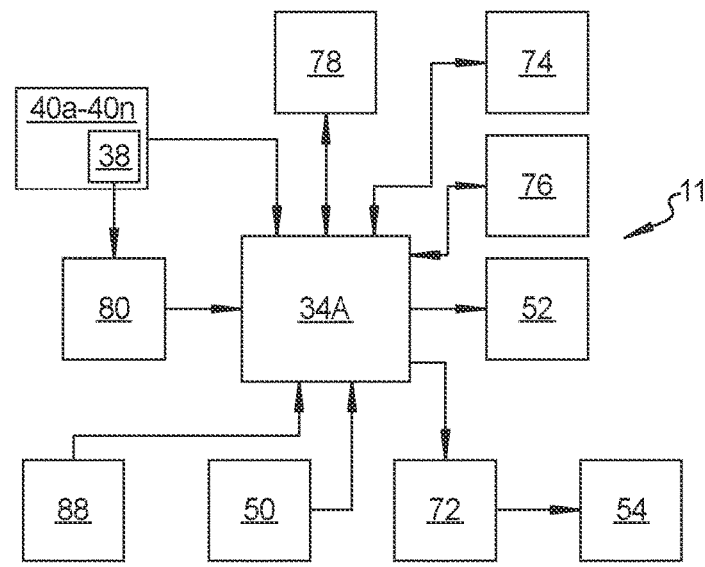
FIG. 2 is a schematic diagram of the system according to an exemplary embodiment.

Referring to FIG. 2 a schematic diagram of the system 11 is shown. The system 11 includes a system controller 34A in communication with the plurality of sensing devices (onboard sensors) 40*a*-40*n*. The system controller 34A may be the vehicle controller 34, or the system controller 34A may be a separate controller in communication with the vehicle controller 34. As discussed above, the system controller 34A is in communication with the plurality of onboard sensors 40*a*-40*n*, which includes at least one camera 38 adapted to capture images of an environment surrounding the vehicle and object therein. In addition to the plurality of onboard sensors 40*a*-40*n*, the system controller 34A is in communication with an external microphone 50, an external speaker 52, and an external projector 54.

Figure 3:
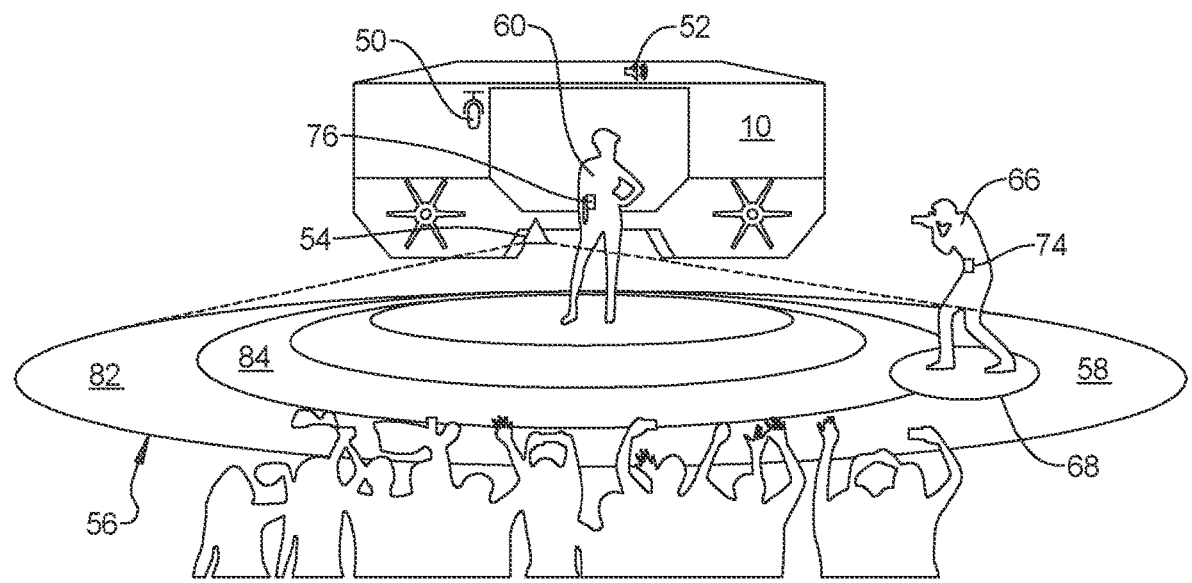
FIG. 3 is a schematic perspective view of an occupant standing next to a vehicle within a projected security zone.

Referring to FIG. 3, in an exemplary embodiment, the system controller 34A is adapted to project, with the external projector 54, a first graphic 56 onto a surface adjacent the vehicle 10. The surface adjacent the vehicle 10 may be a ground surface, parking lot, roadway or any other surface onto which the vehicle 10 is positioned. The external projector 54 is of any known type suitable for projecting images onto the surface adjacent the vehicle 10. The first graphic 56 defines a pre-determined security zone 58.

Figure 4:
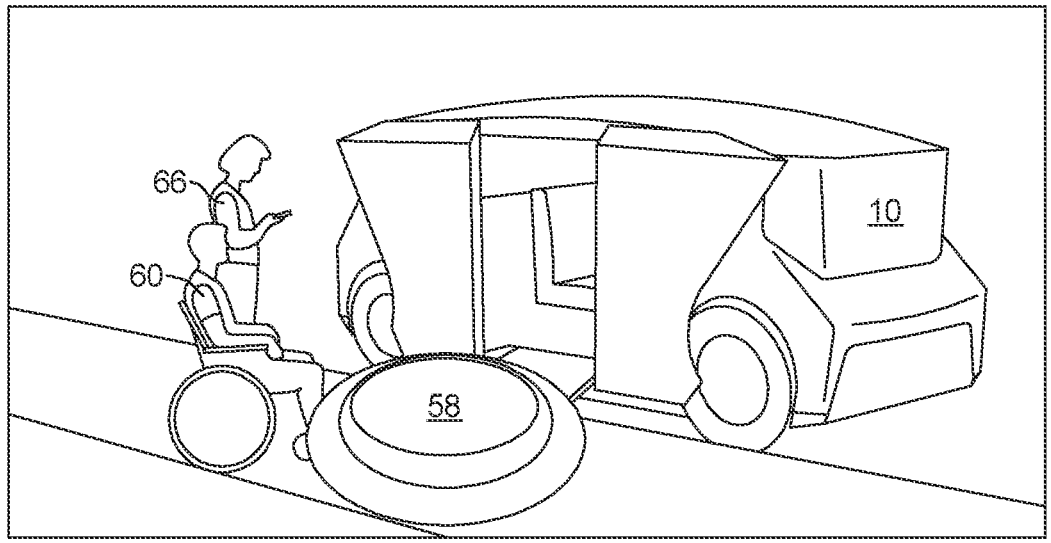
FIG. 4 is schematic perspective view of an occupant in a wheelchair about to enter a vehicle that is projecting a security zone.

The security zone 58 projected onto the ground next to the vehicle 10 provides a visible area that people should stay out of. For example, as shown in FIG. 3, an occupant 60 of the vehicle 10 may be a celebrity or politician, wherein, when the occupant 60 exits the vehicle 10 the security zone 58 is meant to provide a visual barrier that bystanders 62 (fans) should remain outside of. In an exemplary embodiment, the system controller 34A is adapted to detect, with the plurality of onboard sensors 40*a*-40*n*, when the occupant 60 within the vehicle 10 exits the vehicle 10 and to project the first graphic 56 centered around the occupant 60 of the vehicle 10. In another example, referring to FIG. 4, the security zone 58 provides a visual barrier to keep bystanders 62 at a distance as an occupant 60 within a wheelchair enters or exits a vehicle 10. The system controller 34A projects the first graphic upon detection by the system controller 34A that the wheelchair bound occupant is about to enter or exit the vehicle 10, such as when a loading/unloading ramp/platform is extended.

Figure 5:
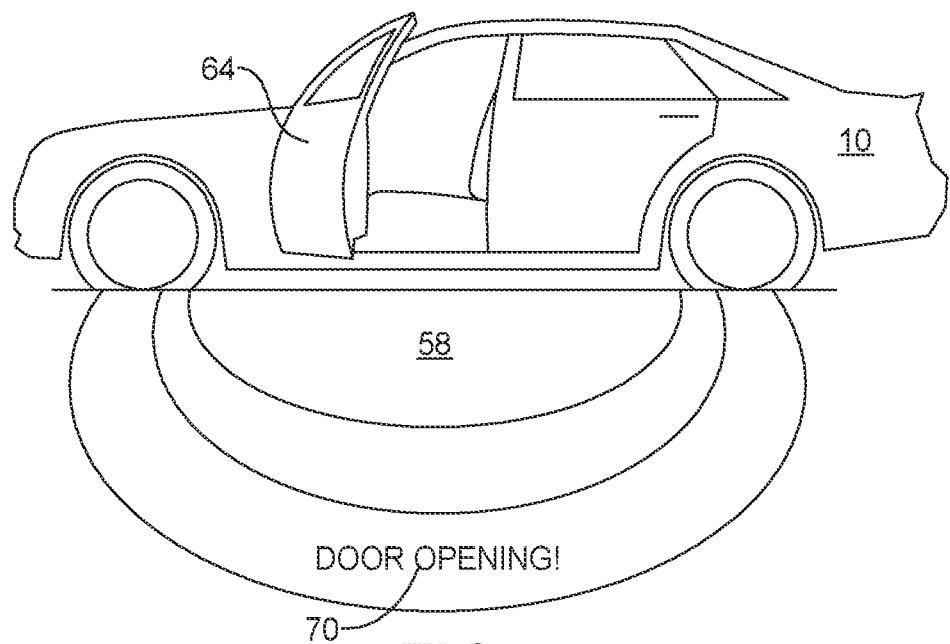
FIG. 5 is a schematic side view of a vehicle projecting a security zone adjacent an open door of the vehicle.

Referring to FIG. 5, in another example, the security zone 58 provides a visual barrier to keep bystanders 62 (walker, bike rider) away from the area immediately adjacent a door 64 to the vehicle 10 which could pose a risk if opened as such bystanders 62 pass by as the door 64 of the vehicle 10 opens. In an exemplary embodiment, the system controller 34A projects the security zone 58 when the system controller 34A detects that an occupant 60 within the vehicle 10 is likely to open the door 64 and exit the vehicle 10. As shown in FIG. 5, the first graphic 56 could further include textual language 70 to further convey a message to bystanders 62, such as shown, wherein the first graphic 56 includes both the security zone 58 and textual language 70 stating "Door Opening".

Figure 6:
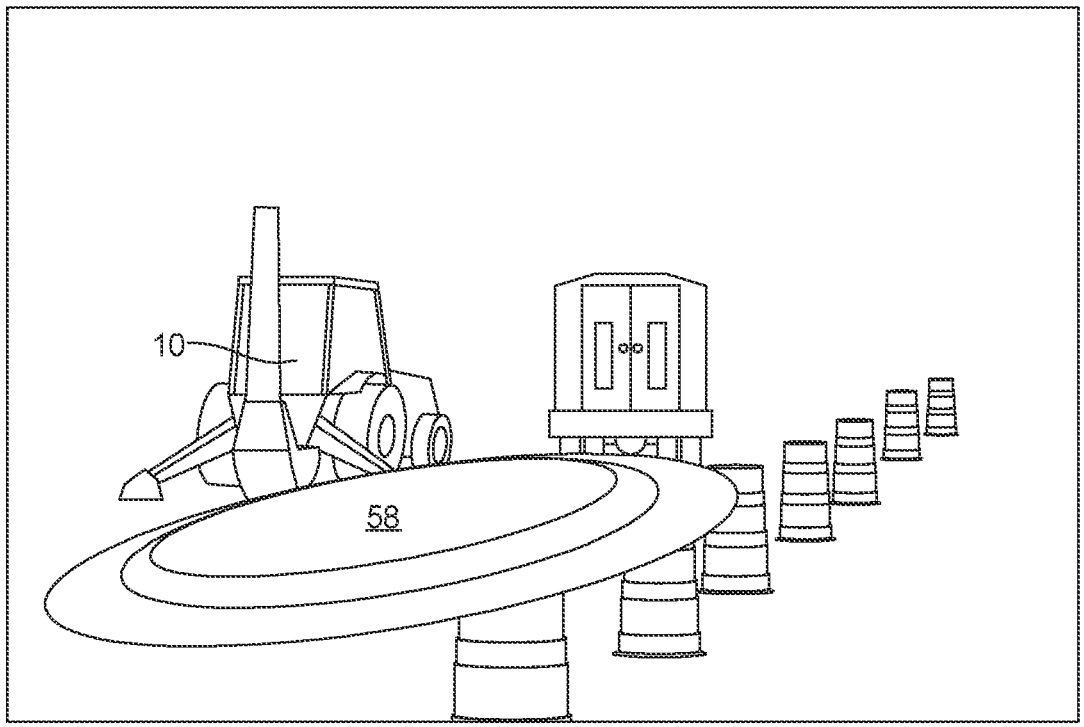
FIG. 6 is schematic perspective view of a vehicle projecting a security zone adjacent the vehicle within a construction zone.
Figure 7:
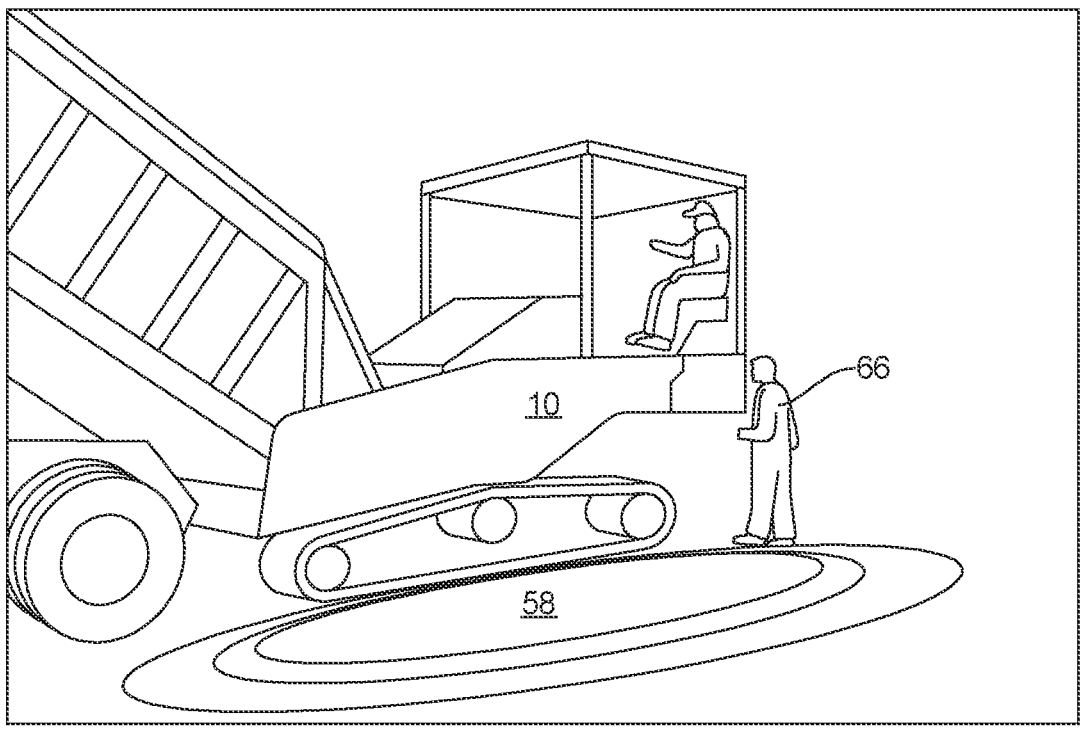
FIG. 7 is a schematic perspective view of a vehicle that is a heavy equipment vehicle projecting a security zone adjacent the vehicle wherein an individual with credentials is standing next to the vehicle within the security zone.

Referring to FIG. 6 and FIG. 7, in another example, the security zone 58 provides a visual barrier to keep people and vehicles away from an area within or adjacent to a construction zone. In yet another example, referring to FIG. 8, the security zone 58 provides a visual barrier to keep people away from an area behind the vehicle 10 when the vehicle 10 is about to move. As shown, the security zone is projected behind the vehicle 10 to warn approaching bystanders 62 that the vehicle may be about to back out of a parking spot, posing a risk to the approaching bystanders 62. In an exemplary embodiment, the security zone is activated when the system controller 34A detects that the vehicle 10 has been placed in reverse and detects the presence of the approaching bystanders 62.

In another exemplary embodiment, the system controller 34A will modify the security zone 58 as circumstances change. For example, the security zone 58 is activated when the vehicle 10 is placed in reverse. Once the vehicle 10 starts to move, the system controller 34A can enlarge the security zone 58 or change the color of the security zone 58 to visually communicate the increased risk. For instance, when the vehicle 10 is in reverse, but not moving, the security zone 58 may be projected as a yellow area, and when the vehicle 10 begins to move backward, the system controller 34A may enlarge the security zone 58 and change the color to red. In addition, if the vehicle 10 is already moving, and accelerates, the system controller 34A may enlarge or change the color of the security zone 58.

In an exemplary embodiment, the plurality of onboard sensors 40a-40n in communication with the system controller 34A are adapted to detect the presence of an individual 66 positioned within the projected security zone 58, and the system controller 34A is adapted to provide a warning to the individual.

In an exemplary embodiment, when providing a warning to the individual 66 the system controller 34A is further adapted to project, with the external projector 54 in communication with the system controller 34A, a second graphic 68 onto the surface adjacent the vehicle 10, the second graphic 68 being color-coded and highlighting the position of the individual 66. Referring again to FIG. 3, the system controller 34A detects the presence of the individual 66 (person taking a picture of the occupant 60) within the projected security zone 58. In response, the system controller 34A, via the projector 54, projects a second graphic 68 (circular highlighted area) centered at the location of the individual 66. The second graphic 68 is intended to provide a visual indication to the individual 66 that the individual 66 has crossed into the security zone 58. The second graphic 68 may be color-coded, wherein, for example, when the individual 66 first enters the security zone 58, the second graphic is yellow, but, if the individual moved further within the security zone 58, or closer to the occupant 60, the second graphic may change from yellow to red. Additionally, if the individual remains within the security zone for longer than a pre-determined amount of time, the second graphic 68 may change from yellow to red. The system controller 34A may further cause the second graphic to change colors in a pattern, flash on and off or get alternately larger/bigger to more effectively catch the attention of the individual 66.

In an exemplary embodiment, the system 11 includes a graphics engine 72 in communication with the system controller 34A. The graphics engine 72 uses data captured by the plurality of onboard sensors 40a-40n to determine an appropriate first graphic 56 and appropriate second graphics 68 depending on the situation, how many individuals 66 are present within the security zone, etc.

Figure 8:
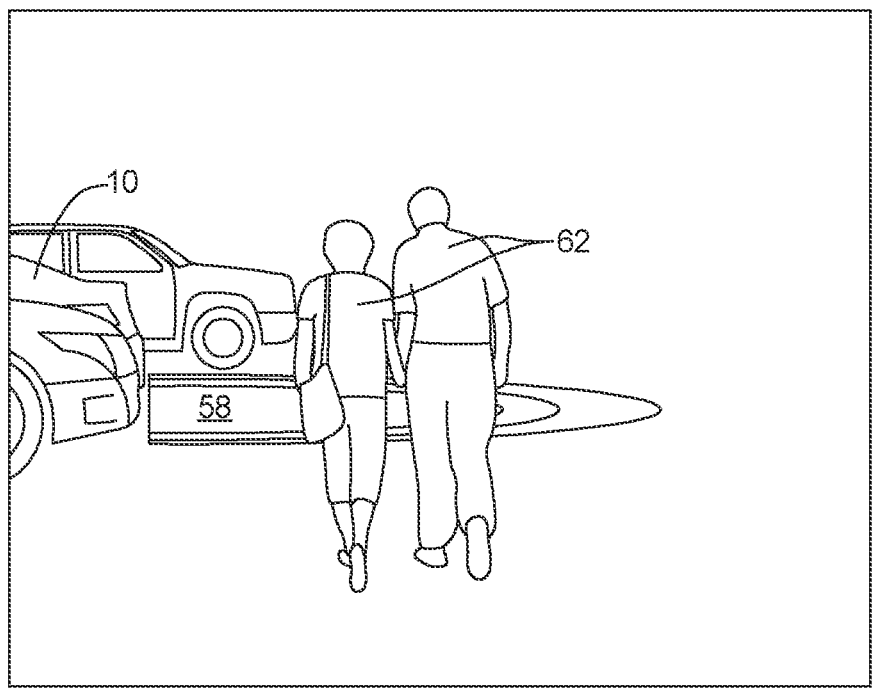
FIG. 8 is a schematic perspective view of two bystanders approaching a projected security zone behind a vehicle that is about to back out of a parking spot.

In an exemplary embodiment, the system controller 34A is further adapted to determine that the individual is still positioned within the security zone 58 after projecting the second graphic 68, and provide, via external speakers 52, an audible warning to the individual 66. Referring again to FIG. 3, if, after projecting the second graphic 68, the system controller 34A, using the plurality of onboard sensors 40a-40n, determines that the individual has not moved outside of the security zone 58, the system controller 34A will provide an audible warning, via the speaker 52. The audible warning may include a subtle clicking or beeping sound, broadcasted by the speaker 52 and meant to catch the attention and inform the individual 66 that the individual 66 has entered the security zone 58. If behavior of the individual 66 persists, the system controller 34A is adapted to increase the severity of the audible warning by, for example, increasing the volume of the audible warning, increasing a pitch of the audible warning, etc. Finally, if behavior of the individual 66 escalates or continues beyond a pre-determined time period, the system controller 34A may use the speaker 52 to provide an audible warning providing verbal instructions to the individual 66. For example, the speaker 53 may broadcast an audible warning stating "Please step back" in the case where a fan has approached a celebrity, as shown in FIG. 3, or, the speaker 53 may broadcast an audible warning stating "Stop!" to the couple approaching a vehicle that is backing out of a parking spot in front of them, as shown in FIG. 8.

In another exemplary embodiment, if the system controller 34A determines that the individual 66 is still positioned within the security zone 58 after projecting the second graphic 68, and providing an audible warning to the individual 66, the system controller 34A is further adapted to provide, via the wireless communication module 36, a warning signal to a personal device 74 carried by the individual 66. Thus, when an individual has entered the security zone, the system controller 34A, after identifying the individual via facial recognition, sends a signal to a cell phone or other personal device being carried by the individual 66 to inform the individual that they have entered the security zone 58.

In another exemplary embodiment, the system controller 34A is further adapted to determine that the individual 66 is still positioned within the security zone 58 after providing the audible warning and to provide, via the wireless communication module 36, a haptic warning signal to the personal device 74 carried by the individual 66. Thus, if the individual 66 has not responded to the projection of the second graphic 68, has not responded to the broadcasting of the audible warning, and has not responded to the warning signal sent to the personal device 74, the system controller 34A will send a signal to the personal device 74 causing the personal device to provide a haptic warning, such as vibrating, beeping, providing a verbal warning, etc.

In an exemplary embodiment, when providing a warning signal to the personal device 74 carried by the individual 66 the system controller 34A is further adapted to provide, via the wireless communication module 36, the warning signal to a personal device 76 carried by the occupant 60, and when providing a haptic warning signal to the personal device 74 carried by the individual 66 the system controller 34A is further adapted to provide, via the wireless communication module 36, the haptic warning signal to the personal device 76 carried by the occupant 60.

Thus, when ever a signal is sent to the personal device 74 of the individual 66, a signal is sent to the personal device 76 of the occupant 60. This informs the occupant 60 of the fact that such signal was sent so the occupant knows when and how an individual 66 within the security zone 58 has been warned and draws the occupant's attention to the individual 66. Further, in another exemplary embodiment, when a signal is sent to the personal device 74 of the individual, the system controller 34A can send such signals to individuals designated ahead of time, such as security personnel or body guards, to alert them to the presence of the individual 66.

In an exemplary embodiment, the system controller 34A is further adapted to determine if the individual 66 possesses credentials authorizing the individual 66 to be positioned within the projected security zone 58. The system controller 34A is adapted to provide a warning to the individual 66 when the individual 66 does not possess credentials authorizing the individual 66 to be positioned within the security zone 58.

The system controller 34A can determine if the individual 66 possesses credentials by accessing, via the wireless communication module 36, digital credentials of the individual 66, wherein the digital credentials are located within at least one of a cloud-based database 78 and the personal device 74 carried by the individual 66. The system controller 34A can further determine if the individual 66 possesses credentials by capturing, with a camera 38 in communication with the system controller 34A, images of the individual 66 and identifying, with a computer vision algorithm 80 within the system controller 34A, physical credentials, wherein the physical credentials include at least one of facial identification, specific clothing and a badge.

Referring again to FIG. 3, as shown, the first graphic 56 projects a security zone 58 that includes multiple layers, wherein, an individual's presence within each specific layer of the security zone 58 is determined by the credentials they possess. For example, as shown in FIG. 3, the individual 66 (photographer) may have the proper credentials to allow the individual 66 to be within a first layer 82 of the security zone 58, but those credentials do not authorize the individual 66 to get closer to the occupant 60 by entering a second layer 84 of the security zone 58. Thus, when the individual 66 moves from the first layer 82 of the security zone 58 to the second layer 84 of the security zone, the system controller 34A provides a warning to inform the individual 66 that they are too close to the occupant 60.

Referring to FIG. 7, the first graphic 56 defines a security zone 58 adjacent to a piece of heavy equipment 86 to keep bystanders away. The system controller 34A detects the presence of the individual 66 within the security zone 58, however, the individual 66 is wearing safety gear and color-coded clothing indicating that the individual is a construction worker. The system controller 34A, using the camera 38 and the computer vision algorithm 80, determines that the individual 66 has credentials authorizing the individual 66 to be located within the security zone 58, and thus, does not provide a warning to the individual 66.

In another exemplary embodiment, the system controller 34A is further adapted to identify threatening behavior exhibited by the individual 66 by at least one of: 1) capturing, with the camera 38 in communication with the system controller 34A, images of the individual 66, and identifying, with the computer vision algorithm 80 within the system controller 34A, threatening gestures made by the individual 66, and 2) receiving, with the system controller 34A, via the external microphone 50, verbal communications from the individual 66 and identifying, with the system controller 34A, threatening language. Even when an individual 66 possesses credentials authorizing the individual 66 to be present within the security zone 58, the system controller 34A is further adapted to provide a warning to the individual 66 when the system controller 34A identifies threatening behavior exhibited by the individual 66.

In an exemplary embodiment, when capturing, with the camera 38 in communication with the system controller 34A, images of the individual 66, and identifying, with the computer vision algorithm 80 within the system controller 34A, threatening gestures made by the individual 66 the system controller 34A is adapted to identify physical properties of the individual 66. Physical properties include the location of the individual 66, body actions, such as is the individual 66 walking, running, crawling, lying down, laughing, crying, reading, pushing, pulling, etc. The system controller 34A further identifies physical properties such as the location and dynamics of the legs, arms and head of the individual 66. Two-dimensional and three-dimensional skeletal location and dynamics of the individual 66 are located and tracked as vector representations. The system controller 34A further tracks movement dynamics of the individual 66, such as direction, speed and acceleration, as well as duration of any actions (how long has the individual 66 been doing that?).

The system controller 34A is adapted to analyze spatiotemporal characteristics of the physical properties of the individual 66. The system controller 34A is adapted to determine if any physical properties of the individual 66 indicate threatening behavior by the individual 66. The system controller 34A is adapted to compare the physical properties of the individual 66 to "normal" patterns which are obtained from a remote database 88 of known patterns which indicate threatening behavior, or from a neural network stored within the system controller 34A that uses machine learning to compile a set of know patterns that indicate threatening behavior. In addition to comparing current patterns to known patterns, other characteristics are used to determine if the movements and actions of an individual 66 should be interpreted as threatening behavior. For instance, in a crowd of people, if an individual 66 exhibits a gesture or action, it may be interpreted by the system controller 34A as threatening behavior. However, if multiple individuals 66 within a group are exhibiting the same gesture or action there is a higher likelihood of threatening behavior. Time is always a significant factor. The longer an action or activity persists, the higher a likelihood that such action or activity constitutes threatening behavior. Similarly, distance from the vehicle 10 or occupant 60 is a significant consideration. The farther away from the vehicle 10 and/or the occupant 60 an individual 66 is, the less likely it is that any behavior on the part of the individual 66 is threatening. If the system controller 34A determines that the physical properties of the individual 66 do not indicated threatening behavior on the part of the individual 66, then the system controller 34A is adapted to continue to analyze spatiotemporal characteristics of the physical properties of the individual 66 that are continuously collected.

Figure 9:
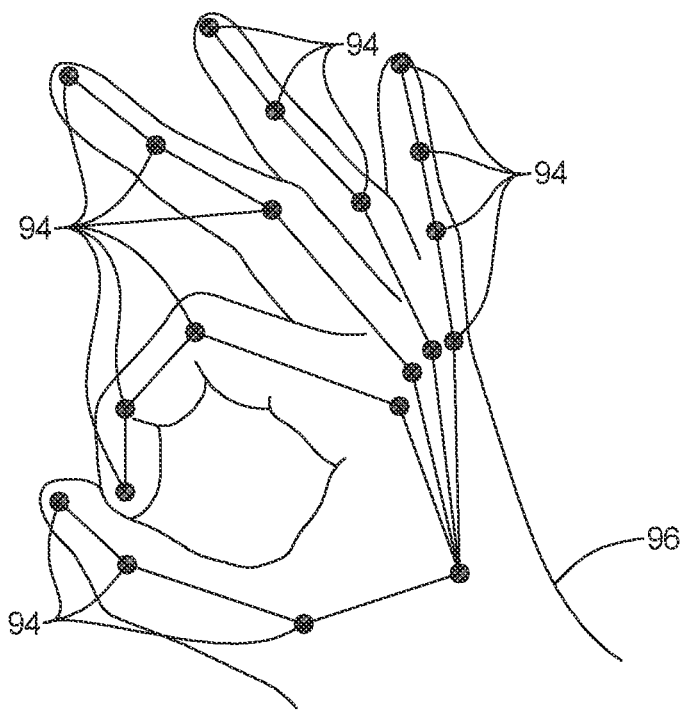
FIG. 9 is diagram of a hand of an individual that is being analyzed by the system controller for threatening behavior.
Figure 10:
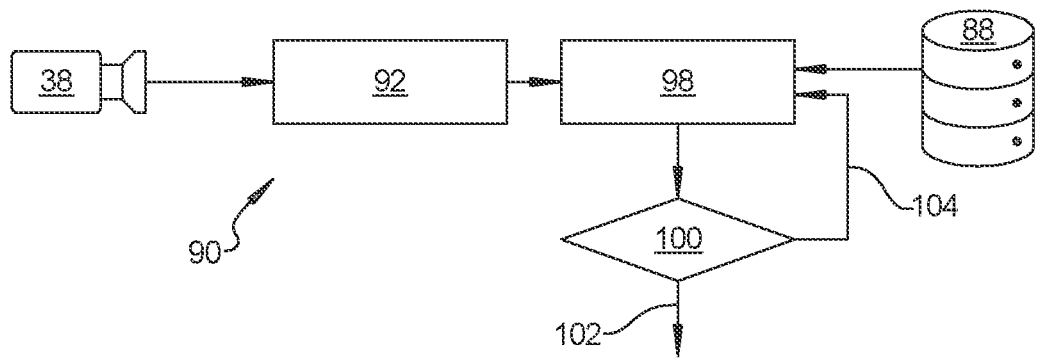
FIG. 10 is a flow chart illustrating the analyzing, with the system controller, spatiotemporal characteristics of the physical properties of the individual.

Referring to FIG. 9 and FIG. 10, in another exemplary embodiment of the present disclosure, when analyzing, with the system controller 34A, spatiotemporal characteristics of the physical properties of the individual 66, at 90, the system controller 34A is further adapted, at 92, to identify key points 94 of a hand 96 of an individual 66. Referring to FIG. 9, key points 94 (as shown, joint locations within the hand and fingers) of the hand 96 of the individual 66 are highlighted and linked, to allow the system controller 34A to determine a shape or gesture that the hand 96 is displaying. The system 11 may use, by way on non-limiting examples, mesh model matching, depth-based methods, deep learning-based post estimation methods, such as Open Pose or Deep Pose, or multi-view bootstrapping when creating a key-point model of the hand 96.

The system controller 34A, at 98, is further adapted to compare identified key points 94 of the hand 96 of the individual 66 to known threatening gestures stored within the remote database 88. Alternatively, the system controller 34A may compare the identified key points 94 of the hand 96 of the individual 66 to known threatening gestures stored within a neural network stored within the system controller 34A that uses machine learning to compile a set of know threatening gestures. At 100, if the system controller 34A determines that the identified key points 94 of the hand 96 of the individual 66 match at least one of the known threatening gestures stored within the database 88, then the system controller 34A is adapted to determine that the individual 66 is exhibiting threatening behavior, as indicated by line 102. If the system controller 34A determines that the identified key points 94 of the hand 96 of the individual 66 do not match at least one of the known threatening gestures stored within the database 88, then the system controller 34A is adapted to continue to compare identified key points 94 of the hand 96 of the individual 66 to the remote database 88 of known threatening gestures, as indicated by line 104.

In another exemplary embodiment, when receiving, with the system controller 34A, via the external microphone 50, verbal communications from the individual 66 and identifying, with the system controller 34A, threatening language, the system controller 34A is further adapted to extract features of acoustic signals captured with the microphone 50 and compare features of the acoustic signals to an optimized model of known sounds that indicate threatening behavior stored within the remote database 88. The system controller 34A is further adapted to determine that the individual 66 is exhibiting threatening behavior when the captured acoustic signals match known sounds from the optimized model. Speech and non-speech sounds that are indicative of threatening behavior includes, but are not limited to, shouting, hit/hitting with a stick sound, impact or crash sounds, cursing, insulting words, threatening words, and bullying and sarcastic sounds such as laugh/derisive deep male voice.

The optimized model is created and updated within the remote database 88. Beginning with a non-speech audio event dataset including data collected, augmented and grouped considering different noise factors such as season, weather conditions, locations, background noise and reverberations, vehicle speed, etc. The data of the non-speech audio event dataset is processed to create a pre-processed non-speech audio event dataset. Discriminative features of the pre-processed non-speech audio event dataset are identified and fed to a training and testing dataset wherein model training/testing takes place, using machine learning algorithms to optimize a candidate model, creating the optimized model of recognized threatening sounds and language.

In an exemplary embodiment, acoustic signals are captured by the microphone 50 and the system controller 34A extracts features of the acoustic signals, such as by, but not limited to, Mel-frequency cepstral coefficients (MFCC), Filterbank Energies, Log Filterbank Energies and Spectral Sub-band Centroids. When such features match features within the optimized model of known threatening sounds, the system controller 34A determines that the individual 66 is exhibiting threatening behavior.

In still another exemplary embodiment, the system controller 34A is further adapted to receive, via the wireless communication module 36, instructions from the occupant 60 to provide a warning to an individual 66 within the projected security zone 58, and to provide a warning to the individual 66 when instructions are received from the occupant 60. Thus, an occupant can, by using an application on a personal device 76, or by using a simple fob actuator, send instructions to the system controller 34A to project a warning for an individual 66. This would over-ride any determination by the system controller 34A that the individual 66 possesses proper credentials or is otherwise allowed to be located within the security zone 58. The occupant 60 can selectively actuate the warning anytime the occupant 60 feels a warning to the individual is needed.

Figure 11:
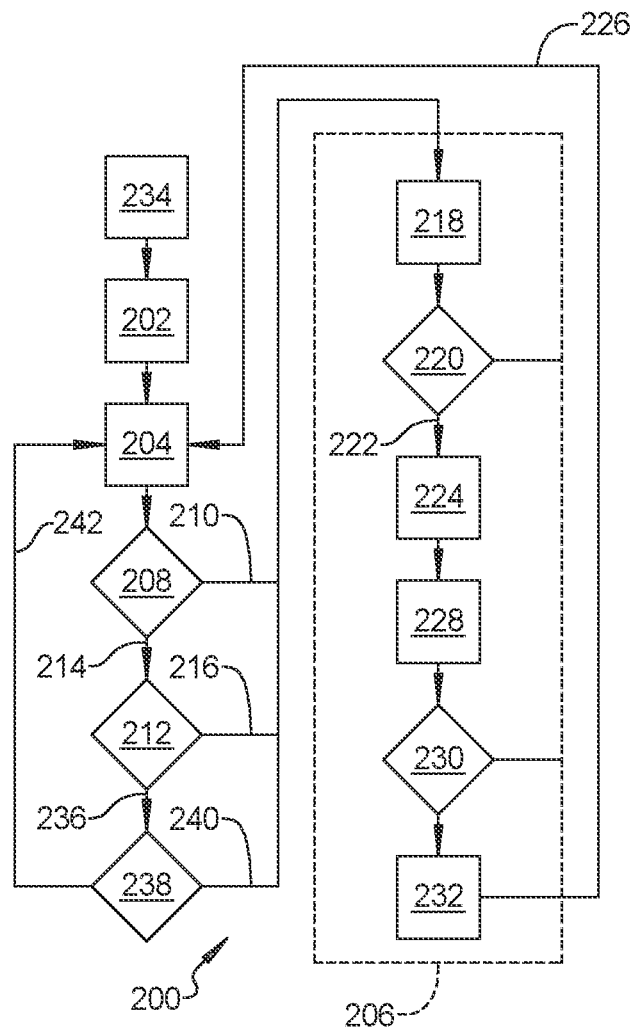
FIG. 11 is a flow chart illustrating a method according to an exemplary embodiment of the present disclosure.

Referring to FIG. 11, a method 200 of providing a projected security zone 58 adjacent a vehicle 10 includes, beginning at block 202, projecting, with an external projector 54 in communication with a system controller 34A, a first graphic 56 onto a surface adjacent the vehicle 10, the first graphic 56 defining a pre-determined security zone 58, moving to block 204, detecting, with a plurality of onboard sensors 40a-40n in communication with the system controller 34A, the presence of an individual 66 positioned within the projected security zone 58, and, moving to block 206, providing, with the system controller 34A, a warning to the individual 66.

In an exemplary embodiment, the method 200 further includes, moving to block 208, determining, with the system controller 34A, if the individual 66 possesses credentials authorizing the individual 66 to be positioned within the projected security zone 58, and, the providing, with the system controller 34A, a warning to the individual 66 at block 206 further includes providing, with the system controller 34A, a warning to the individual 66 when the individual 66 does not possess credentials authorizing the individual 66 to be positioned within the security zone 58, as indicated by line 210.

In an exemplary embodiment, the determining, with the system controller 34A, if the individual 66 possesses credentials authorizing the individual 66 to be positioned within the projected security zone 58 at block 208 further includes accessing, with the system controller 34A, via a wireless communication module 36, digital credentials of the individual 66, wherein the digital credentials are located within at least one of a cloud-based database 78 and a personal device 74 carried by the individual 66.

In another exemplary embodiment, the determining, with the system controller 34A, if the individual 66 possesses credentials authorizing the individual 66 to be positioned within the projected security zone 58 at block 208 further includes capturing, with a camera 38 in communication with the system controller 34A, images of the individual 66 and identifying, with a computer vision algorithm 80 within the system controller 34A, physical credentials, wherein the physical credentials include at least one of facial identification, specific clothing and a badge.

In an exemplary embodiment, the method 200 further includes, moving from block 208 to block 212, identifying, with the system controller 34A, threatening behavior exhibited by the individual 66, wherein, the providing, with the system controller 34A, a warning to the individual 66 at block 206 further includes providing, with the system controller 34A, a warning to the individual 66 when the individual 66 possesses credentials authorizing the individual 66 to be positioned within the security zone 58, as indicated by line 214, and the system controller 34A identifies threatening behavior exhibited by the individual 66, as indicated by line 216.

In an exemplary embodiment, the identifying, with the system controller 34A, threatening behavior exhibited by the individual 66 at block 212 further includes at least one of receiving, with the system controller 34A, via an external microphone 50, verbal communications from the individual 66 and identifying, with the system controller 34A, threatening language, and capturing, with a camera 38 in communication with the system controller 34A, images of the individual 66, and identifying, with a computer vision algorithm 80 within the system controller 34A, threatening gestures made by the individual 66.

In another exemplary embodiment, the providing, with the system controller 34A, a warning to the individual 66 at block 206 further includes, moving to block 218, projecting, with the external projector 54 in communication with the system controller 34A, a second graphic 68 onto the surface adjacent the vehicle 10, the second graphic 68 being color-coded and highlighting the position of the individual 66.

In an exemplary embodiment, the providing, with the system controller 34A, a warning to the individual 66 at block 206 further includes, after projecting the second graphic 68 at block 218, moving to block 220, determining, with the system controller 34A, that the individual 66 is still positioned within the security zone 58, as indicated by line 222, and, moving to block 224, providing, via external speakers 52, an audible warning to the individual 66. If, at block 220, the individual 66 is not still positioned within the security zone 58, the method 200 reverts back to block 204, as indicated by line 226.

In another exemplary embodiment, the method 200 further includes, moving from block 224 to block 228, providing, with the system controller 34A, via a wireless communication module 36, a warning signal to a personal device 74 carried by the individual 66.

In an exemplary embodiment, the providing, with the system controller 34A, a warning to the individual 66 at block 206 further includes, after providing, via the external speakers 52, an audible warning to the individual 66 at block 224, moving to block 230, determining, with the system controller 34A, that the individual 66 is still positioned within the security zone 58, and, moving to block 232, providing, with the system controller 34A, via the wireless communication module 36, a haptic warning signal to the personal device 74 carried by the individual 66. If, at block 230, the system controller 34A determines that the individual 66 is not still positioned within the security zone 58, then the method 200 reverts back to block 204, as indicated by line 226. After providing the haptic signal at block 232, the method 200 reverts back to block 204 as indicated by line 226.

In another exemplary embodiment, the method 200 further includes, at block 234, detecting, with the plurality of onboard sensors 40*a*-40*n*, when an occupant 60 within the vehicle 10 exits the vehicle 10, wherein, the projecting, with the external projector 54 in communication with the system controller 34A, the first graphic 56 onto the surface adjacent the vehicle 10 at block 202 further includes projecting, with the external projector 54, the first graphic 56 onto the surface adjacent the vehicle 10 and centered around the occupant 60 of the vehicle 10.

In an exemplary embodiment, the providing, with the system controller 34A, via the wireless communication module 36, a warning to a personal device 74 carried by the individual 66 at block 228 further includes providing, with the system controller 34A, via the wireless communication module 36, a warning message to a personal device 76 carried by the occupant 60, and the providing, with the system controller 34A, via the wireless communication module 36, a haptic warning signal to a personal device 74 carried by the individual 66 further includes providing, with the system controller 34A, via the wireless communication module 36, a haptic warning signal to a personal device 76 carried by the occupant 60.

In another exemplary embodiment, the method 200 further includes, if the system controller 34A does not identify threatening behavior exhibited by the individual 66 at block 212, as indicated by line 236, then, moving to block 238, receiving, with the system controller 34A, via the wireless communication module 36, instructions from the occupant 60 to provide a warning to an individual 66 within the projected security zone 58, wherein, the providing, with the system controller 34A, a warning to the individual 66 at block 206 further includes providing, with the system controller 34A, a warning to the individual 66 when instructions are received from the occupant 60, as indicated by line 240. If at block 238, no instructions are received from the occupant 60, then the method 200 reverts back to block 204, as indicated by line 242.

A system and method of the present disclosure offers the advantage of providing a warning to an individual when the individual is located within a security zone.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method of providing a projected security zone adjacent a vehicle; comprising:
   projecting, with an external projector in communication with a system controller, a first graphic onto a surface adjacent the vehicle, the first graphic defining a predetermined security zone;
   detecting, with a plurality of onboard sensors in communication with the system controller, the presence of an individual positioned within the projected security zone; and
   providing, with the system controller, a warning to the individual by projecting, with the external projector in communication with the system controller, a second graphic onto the surface adjacent the vehicle, the second graphic being color-coded and highlighting a position of the individual.

2. The method of claim 1 further including:
   determining, with the system controller, if the individual possesses credentials authorizing the individual to be positioned within the projected security zone; and
   wherein, the providing, with the system controller, a warning to the individual further includes providing, with the system controller, a warning to the individual when the individual does not possess credentials authorizing the individual to be positioned within the security zone.

3. The method of claim 2, wherein the determining, with the system controller, if the individual possesses credentials authorizing the individual to be positioned within the projected security zone further includes:
  accessing, with the system controller, via a wireless communication module, digital credentials of the individual, wherein the digital credentials are located within at least one of a cloud-based database or a personal device carried by the individual.

4. The method of claim 2, wherein the determining, with the system controller, if the individual possesses credentials authorizing the individual to be positioned within the projected security zone further includes:
  capturing, with a camera in communication with the system controller, images of the individual; and
  identifying, with a computer vision algorithm within the system controller, physical credentials, wherein the physical credentials include at least one of facial identification, specific clothing or a badge.

5. The method of claim 2 further including:
  identifying, with the system controller, threatening behavior exhibited by the individual; and
  wherein, the providing, with the system controller, a warning to the individual further includes providing, with the system controller, a warning to the individual when the individual possesses credentials authorizing the individual to be positioned within the security zone, and the system controller identifies threatening behavior exhibited by the individual.

6. The method of claim 5, wherein the identifying, with the system controller, threatening behavior by exhibited by the individual further includes at least one of:
  receiving, with the system controller, via an external microphone, verbal communications from the individual and identifying, with the system controller, threatening language; or
  capturing, with a camera in communication with the system controller, images of the individual, and identifying, with a computer vision algorithm within the system controller, threatening gestures made by the individual.

7. The method of claim 2 wherein the providing, with the system controller, a warning to the individual by projecting, with the external projector in communication with the system controller, a second graphic onto the surface adjacent the vehicle, the second graphic being color-coded and highlighting the position of the individual further includes projecting, with the external projector, the second graphic, wherein the second graphic is adapted to provide a visual indication to the individual that the individual has crossed into the security zone.

8. The method of claim 7 wherein the providing, with the system controller, a warning to the individual further includes:
  after projecting the second graphic, determining, with the system controller, that the individual is still positioned within the safety zone; and
  providing, via external speakers, an audible warning to the individual.

9. The method of claim 8, further including providing, with the system controller, via a wireless communication module, a warning signal to a personal device carried by the individual.

10. The method of claim 9 wherein the providing, with the system controller, a warning to the individual further includes:
  after providing, via the external speakers, an audible warning to the individual, determining, with the system controller, that the individual is still positioned within the security zone; and
  providing, with the system controller, via the wireless communication module, a haptic warning signal to the personal device carried by the individual.

11. The method of claim 10, further including:
  detecting, with the plurality of onboard sensors, when an occupant within the vehicle exits the vehicle; and
  wherein, the projecting, with an external projector in communication with the system controller, the first graphic onto the surface adjacent the vehicle further includes projecting, with the external projector, the first graphic onto the surface adjacent the vehicle and centered around the occupant of the vehicle.

12. The method of claim 11 wherein:
  the providing, with the system controller, via the wireless communication module, a warning to a personal device carried by the individual further includes providing, with the system controller, via the wireless communication module, a warning message to a personal device carried by the occupant; and
  the providing, with the system controller, via the wireless communication module, a haptic warning signal to a personal device carried by the individual further includes providing, with the system controller, via the wireless communication module, a haptic warning signal to a personal device carried by the occupant.

13. The method of claim 12, further including:
  receiving, with the system controller, via the wireless communication module, instructions from the occupant to provide a warning to an individual within the projected security zone; and
  wherein, the providing, with the system controller, a warning to the individual further includes providing, with the system controller, a warning to the individual when instructions are received from the occupant.

14. A system for providing a projected security zone adjacent a vehicle; comprising:
  an external projector in communication with a system controller and adapted to project a first graphic onto a surface adjacent the vehicle, the first graphic defining a pre-determined security zone; and
  a plurality of onboard sensors in communication with the system controller and adapted to detect the presence of an individual positioned within the projected security zone;
  the system controller adapted to project, with the external projector in communication with the system controller, a second graphic onto the surface adjacent the vehicle, the second graphic being color-coded and highlighting the position of the individual to provide a warning to the individual.

15. The system of claim 14 wherein the system controller is further adapted to:
  determine if the individual possesses credentials authorizing the individual to be positioned within the projected security zone by at least one of:
  accessing, with the system controller, via a wireless communication module, digital credentials of the individual, wherein the digital credentials are located within at least one of a cloud-based database and a personal device carried by the individual; or capturing, with a camera in communication with the system controller, images of the individual and identifying, with a computer vision algorithm within the system controller, physical credentials, wherein the physical credentials include at least one of facial identification, specific clothing and a badge;

wherein, the system controller is adapted to provide a warning to the individual when the individual does not possess credentials authorizing the individual to be positioned within the security zone.

16. The system of claim 15 wherein the system controller is further adapted to identify threatening behavior exhibited by the individual by at least one of:

receiving, with the system controller, via an external microphone, verbal communications from the individual and identifying, with the system controller, threatening language; or capturing, with a camera in communication with the system controller, images of the individual, and identifying, with a computer vision algorithm within the system controller, threatening gestures made by the individual; and wherein, the system controller is further adapted to provide a warning to the individual when the individual possesses credentials authorizing the individual to be positioned within the security zone, and the system controller identifies threatening behavior exhibited by the individual.

17. The system of claim 16 wherein when providing a warning to the individual the system controller is further adapted to:

determine that the individual is still positioned within the security zone after projecting the second graphic, and provide, via external speakers, an audible warning to the individual and provide, via the wireless communication module, a warning signal to a personal device carried by the individual; and determine that the individual is still positioned within the security zone after providing the audible warning and provide, via the wireless communication module, a haptic warning signal to the personal device carried by the individual.

18. The system of claim 17, wherein the system controller is further adapted to:

detect, with the plurality of onboard sensors, when an occupant within the vehicle exits the vehicle and to project the first graphic centered around the occupant of the vehicle;

receive, via the wireless communication module, instructions from the occupant to provide a warning to an individual within the projected security zone; and provide a warning to the individual when instructions are received from the occupant.

19. The system of claim 18 wherein, when providing a warning signal to the personal device carried by the individual the system controller is further adapted to provide, via the wireless communication module, the warning signal to a personal device carried by the occupant, and when providing a haptic warning signal to the personal device carried by the individual the system controller is further adapted to provide, via the wireless communication module, a haptic warning signal to the personal device carried by the occupant.

20. A vehicle having a system for providing a projected security zone adjacent the vehicle, the system comprising:

a system controller adapted to detect, with a plurality of onboard sensors, when an occupant within the vehicle exits the vehicle;

an external projector in communication with a system controller and adapted to project a first graphic onto a surface adjacent the vehicle, the first graphic defining a pre-determined security zone centered around the occupant; and a plurality of onboard sensors in communication with the system controller and adapted to detect the presence of an individual positioned within the projected security zone;

the system controller adapted to:

determine if the individual possesses credentials authorizing the individual to be positioned within the projected security zone by at least one of:

accessing, with the system controller, via a wireless communication module, digital credentials of the individual, wherein the digital credentials are located within at least one of a cloud-based database and a personal device carried by the individual; or capturing, with a camera in communication with the system controller, images of the individual and identifying, with a computer vision algorithm within the system controller, physical credentials, wherein the physical credentials include at least one of facial identification, specific clothing and a badge; and identify threatening behavior exhibited by the individual by at least one of:

receiving, with the system controller, via an external microphone, verbal communications from the individual and identifying, with the system controller, threatening language; or capturing, with a camera in communication with the system controller, images of the individual, and identifying, with a computer vision algorithm within the system controller, threatening gestures made by the individual;

wherein, the system controller is adapted to provide a warning to the individual when:

the individual does not possess credentials authorizing the individual to be positioned within the security zone;

when the individual possesses credentials authorizing the individual to be positioned within the security zone, and the system controller identifies threatening behavior exhibited by the individual; and when instructions are received from the occupant;

further wherein, when providing a warning to the individual the system controller is further adapted to:

project, with the external projector in communication with the system controller, a second graphic onto the surface adjacent the vehicle, the second graphic being color-coded and highlighting the position of the individual;

determine that the individual is still positioned within the security zone after projecting the second graphic, and provide, via external speakers, an audible warning to the individual and provide, via the wireless communication module, a warning signal to a personal device carried by the individual and to a personal device carried by the occupant; and determine that the individual is still positioned within the security zone after providing the audible warning and provide, via the wireless communication module, a haptic warning signal to the personal device carried by the individual and to the personal device carried by the occupant.

* * * * *